United States Patent
Kang et al.

(10) Patent No.: US 9,536,118 B2
(45) Date of Patent: Jan. 3, 2017

(54) CARD READER AND METHOD OF OPERATING THE SAME

(71) Applicant: Samsung Electronics Co., Ltd., Suwon-si, Gyeonggi-do (KR)

(72) Inventors: Hyunjae Kang, Seoul (KR); Junho Kim, Yongin-si (KR); Iljong Song, Suwon-si (KR); Sangchan Park, Incheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/817,706

(22) Filed: Aug. 4, 2015

(65) Prior Publication Data

US 2016/0086002 A1    Mar. 24, 2016

(30) Foreign Application Priority Data

Sep. 18, 2014    (KR) .................. 10-2014-0124422

(51) Int. Cl.
*H04Q 5/22*    (2006.01)
*G06K 7/10*    (2006.01)
*G06F 13/42*    (2006.01)

(52) U.S. Cl.
CPC ............................. *G06K 7/10128* (2013.01)

(58) Field of Classification Search
CPC ................................................ G06K 7/10128
See application file for complete search history.

(56) References Cited

U.S. PATENT DOCUMENTS

| | | | |
|---|---|---|---|
| 7,266,048 B1 * | 9/2007 | King | G07C 1/16 235/377 |
| 7,307,964 B2 | 12/2007 | Nakai et al. | |
| 8,026,795 B2 | 9/2011 | Qi | |
| 8,240,561 B2 | 8/2012 | Busch-Sorensen | |
| 8,699,949 B2 | 4/2014 | Thevenon et al. | |
| 2007/0205867 A1 * | 9/2007 | Kennedy | H04W 99/00 340/10.1 |
| 2011/0274141 A1 * | 11/2011 | Jantunen | H04B 1/7183 375/138 |
| 2015/0186328 A1 * | 7/2015 | Bonen | G11C 29/028 710/105 |

FOREIGN PATENT DOCUMENTS

JP    2006303970 A    11/2006
JP    2009265721 A    11/2009
(Continued)

*Primary Examiner* — Erin File
(74) *Attorney, Agent, or Firm* — Harness, Dickey & Pierce, P.L.C.

(57) ABSTRACT

A card reader performing a wireless communication with a card includes a first pulse generation unit generating a first detection pulse for detecting the card, a second pulse generation unit generating a plurality of second detection pulses for detecting the card, or a plurality of communication pulses for communicating with the card, and a card detection unit for sensing a card being detected by the first detection pulse or the second detection pulses. In the case that the card is not sensed through the first detection pulse, the second pulse generation unit generates the second detection pulses using the communication pulses and senses the card using the second detection pulses.

20 Claims, 11 Drawing Sheets

(56) References Cited

FOREIGN PATENT DOCUMENTS

| | | |
|---|---|---|
| JP | 2010134524 A | 6/2010 |
| KR | 100516968 B1 | 9/2005 |
| KR | 100659180 B1 | 12/2006 |
| KR | 100796011 B1 | 1/2008 |
| WO | WO-2008140156 A1 | 11/2008 |

* cited by examiner

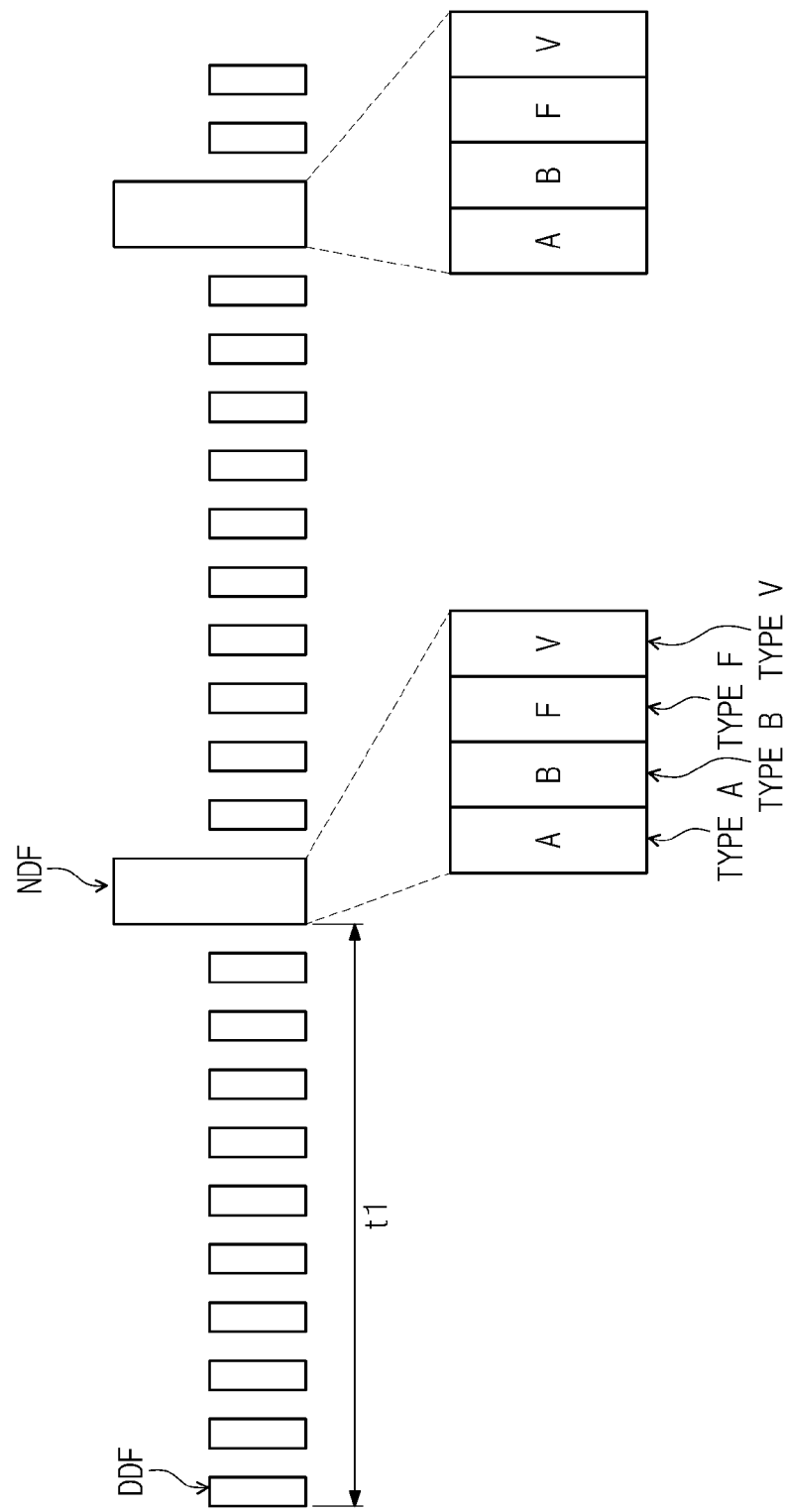

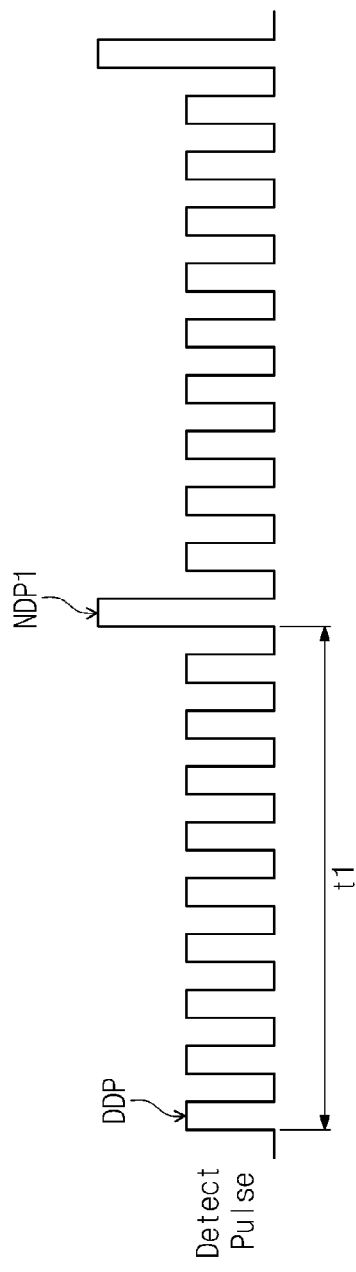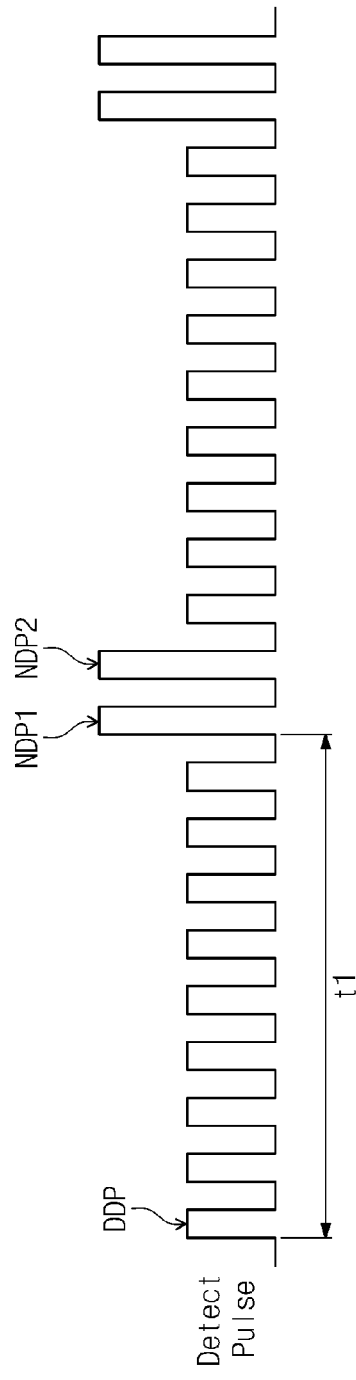

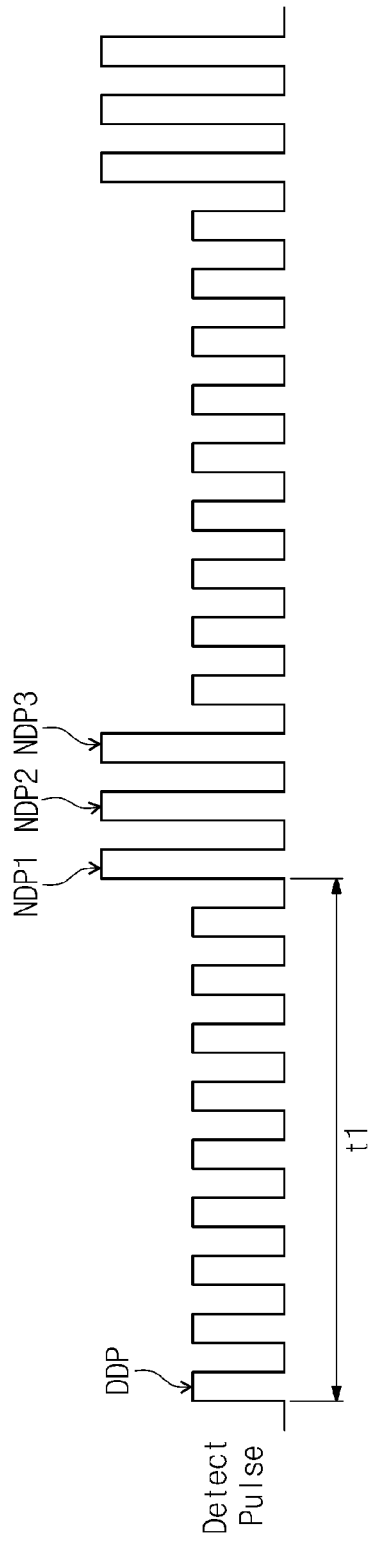
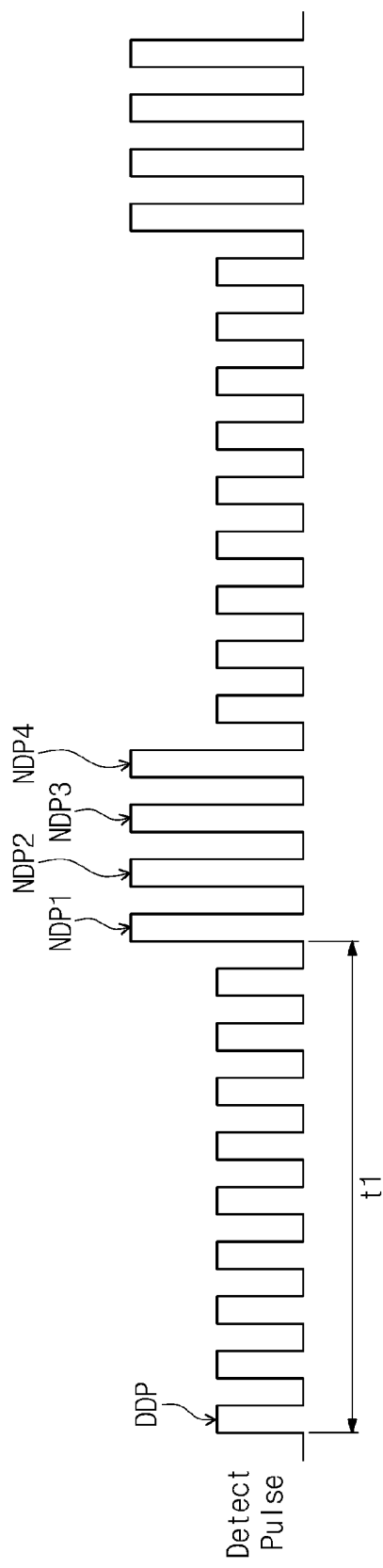

CARD READER AND METHOD OF OPERATING THE SAME

CROSS-REFERENCE TO RELATED APPLICATIONS

This U.S. non-provisional patent application claims priority under 35 U.S.C. §119 of Korean Patent Application No. 10-2014-0124422, filed on Sep. 18, 2014, the entire contents of which are hereby incorporated by reference.

BACKGROUND

Example embodiments of the inventive concepts relate to a card reader. For example, at least some example embodiments relate to a card reader and/or a method of operating the card reader.

A near field communication (NFC) is usually performed between a card and a reader. The card may be built in a mobile device such as a smart phone for a contactless electronic approval.

An NFC protocol is one field of conventional RFID (radio frequency identification) and can operate a terminal fitted with a tag as an active mode. As a result, the NFC protocol can perform not only a function as a tag but also a reader reading a tag, a writer inputting information into a tag and P2P between terminals.

An NFC protocol is prescribed by standard in ISO 18092 and can perform a near field communication using various frequency signals such as 125 kHz, 135 kHz, and 900 MHz besides 13.56 MHz. The NFC protocol can support a reader such as an ISO 14443 TYPEA (Mifare), a TYPEB, a TYPEF (felica) and an IOS 15693 TYPEV and a card such as a TYPEA, a TYPEB, a TYPEF, and a TYPEV.

Recently, a size of an antenna of a card reader using an NFC protocol may be reduced. By using a small size antenna, a distance that a card can be detected using a card detection pulse is reduced. Thus, the maximum wireless communication distance that a card can be detected may be reduced.

SUMMARY

Example embodiments of the inventive concepts relate to a card reader performing a wireless communication with a card.

In some example embodiments, the card reader may include a first pulse generation unit generating a first detection pulse for detecting the card, a second pulse generation unit generating a plurality of second detection pulses for detecting the card, or a plurality of communication pulses for communicating with the card, and a card detection unit for sensing a card being detected by the first detection pulse or the second detection pulses. In the case that the card is not sensed through the first detection pulse, the second pulse generation unit generates the second detection pulses using the communication pulses and senses the card using the second detection pulses.

Example embodiments of the inventive concepts also relate to an operation method of a card reader detecting a card.

In some example embodiments, the operation method may include periodically outputting a first detection pulse for detecting the card, determining whether the card is detected, and sequentially outputting a plurality of second detection pulses using a plurality of communication pulses for communicating with the card according to a determination result.

Example embodiments of the inventive concepts also provide a card reader.

In some example embodiments, the card reader includes an antenna and a processor. The processor may be configured to, output, via the antenna, a first detection pulse to detect a card, and output second detection pulses, if the card is not detected by the first detection pulse, the second detection pulses being generated using communication pulses associated with communicating with the card.

In some example embodiments, the processor is configured to detect the card by waiting for receipt of reflection signal from the card in response to the card receiving one of the first detection pulse and the second detection pulses.

In some example embodiments, the card reader is configured to support near field communication to communicate data with the card using the communication pulses after the card is detected.

In some example embodiments, the card reader is configured to generate the second detection pulses such that the second detection pulses have a signal level higher than a signal level of the first detection pulse and guard times shorter than the communication pulses.

In some example embodiments, the card reader is configured to supply power to the card during a first one of the guard times, and wait for a response from the card during a second one of the guard times.

In some example embodiments, the response from the card is a reflection signal generated in response to one of the first detection pulse and the second detection pulses.

BRIEF DESCRIPTION OF THE DRAWINGS

Example embodiments of the inventive concepts will be described below in more detail with reference to the accompanying drawings. The example embodiments of the inventive concepts may, however, be embodied in different forms and should not be construed as limited to the example embodiments set forth herein. Rather, these example embodiments are provided so that this disclosure will be thorough and complete, and will fully convey the scope of the inventive concepts to those skilled in the art. Like numbers refer to like elements throughout.

FIGS. 2A and 2B are block diagrams illustrating a new detection pulse in accordance with some example embodiments of the inventive concepts and a structure of the detection pulse using the detection pulse.

FIG. 4 is a timing diagram illustrating a card detection pulse in accordance with a first example embodiment of the inventive concepts.

FIG. 5 is a timing diagram illustrating a card detection pulse in accordance with a second example embodiment of the inventive concepts.

FIG. 6 is a timing diagram illustrating a card detection pulse in accordance with a third example embodiment of the inventive concepts.

FIG. 7 is a timing diagram illustrating a card detection pulse in accordance with a fourth example embodiment of the inventive concepts.

DETAILED DESCRIPTION

Figure 1:
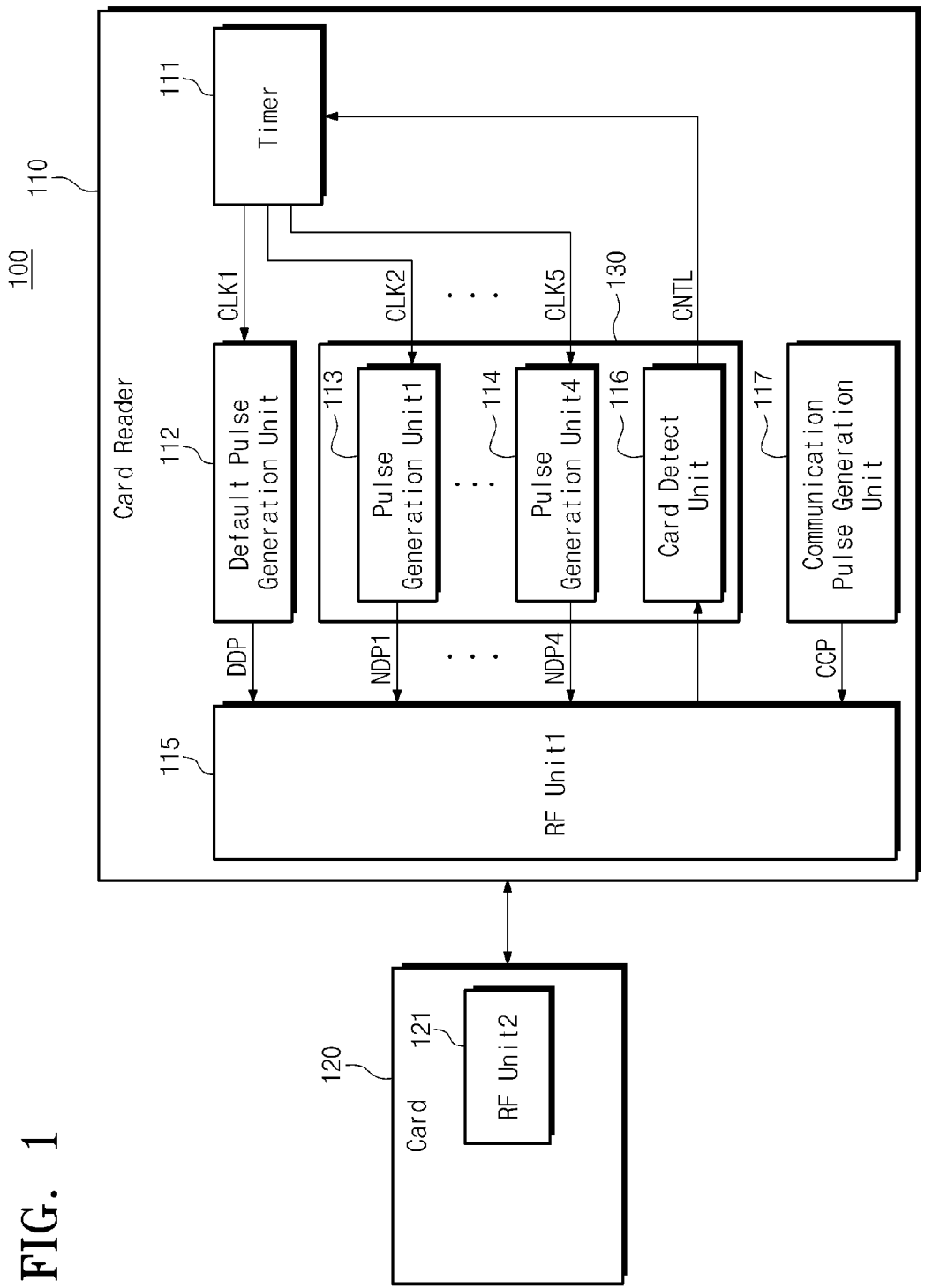
FIG. 1 is a block diagram illustrating a wireless communication system in accordance with a first example embodiment of the inventive concepts.

Example embodiments of inventive concepts will be described more fully hereinafter with reference to the accompanying drawings, in which some example embodiments are shown. These inventive concepts may, however, be embodied in many different forms and should not be construed as limited to the example embodiments set forth herein. Rather, these example embodiments are provided so that this disclosure will be thorough and complete, and will fully convey the scope of the example embodiments of the inventive concepts to those skilled in the art. In the drawings, the size and relative sizes of layers and regions may be exaggerated for clarity. Like numbers refer to like elements throughout.

It will be understood that, although the terms first, second, etc. may be used herein to describe various elements, these elements should not be limited by these terms. These terms are only used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will also be understood that when an element such as a layer, region or substrate is referred to as being "on" or "onto" another element, it may lie directly on the other element or intervening elements or layers may also be present.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a block diagram illustrating a wireless communication system in accordance with a first example embodiment of the inventive concepts.

Referring to FIG. 1, a wireless communication system 100 in accordance with some example embodiments of the inventive concepts can support a function of a near field communication (NFC). The wireless communication system 100 may include a card reader 110 and a card 120.

The card reader 110 may include a timer 111, a first pulse generation unit 112, a second pulse generation unit 130, a first antenna unit 115 and a card detection unit 117.

The timer 111 outputs first through fifth clock pulse CLK1~CLK5 at specific time intervals. The timer 111 can output the first through fifth clock pulse CLK1~CLK5 over a period of different time intervals respectively. For instance, the timer 111 can output a first clock signal CLK1 to the first pulse generation unit 112 at intervals of 500 ms from a time period of 2 s through 3 s. However, example embodiments are not limited thereto.

The timer 111 outputs the second through fifth clock signals CLK2~CLK5 to first through fourth pulse generators 113 and 114.

The timer 111 outputs the second through fifth clock signals CLK2~CLK5 after the first clock signal CLK1 is completely output. The timer 111 can output the second through fifth clock signals CLK2~CLK5 at the same time. The timer 111 can sequentially output the second through fifth clock signals CLK2~CLK5.

For convenience of description, it is assumed that the first through fifth clock signals CLK1~CLK5 are output from the timer 111. However, a signal being output from the timer 111 is not limited the first through fifth clock signals CLK1~CLK5.

The timer 111 may output the first through fifth clock signals CLK1~CLK5 according to a control signal CNTL received from the card detection unit 116. The timer 111 may output only a part of the first through fifth clock signals CLK1~CLK5 according the control signal CNTL output from the card detection unit 116. The timer 111 may also stop an output of the first through fifth clock signals CLK1~CLK5 according to the control signal CNTL.

The first pulse generation unit 112 receives the first clock signal CLK1 from the timer 111. The first pulse generation unit 112 outputs a default detection pulse DDP to the first antenna unit 115 at intervals of 500 ms during 2 s through 3 s. However, an output period of the default detection pulse DDP is not limited thereto. The first pulse generation unit 112 may be called a first detection pulse generation unit 112.

The second pulse generation unit 130 may include the first through fourth pulse generators 113 and 114 and a card detection unit 116. As illustrated in FIG. 1, the second pulse generator unit 130 may include the first pulse generator 113 and the fourth pulse generator 114, as well as the second and third pulse generators (not shown). For convenience of description, it is assumed that first through fourth pulse generators 113 and 114 are associated with the second pulse generation unit 130. However, example embodiments are not limited thereto.

The first through fourth pulse generators 113 and 114 receive the second through fifth clock signals CLK2~CLK5 from the timer 111, respectively. The first through fourth pulse generators 113 and 114 output first through fourth new detection pulses NDP1~NDP4 to the first antenna unit 115 according to the second through fifth clock signals CLK2~CLK5.

The first through fourth pulse generators 113 and 114 may output only a part of new first through fourth detection pulses NDP1~NDP4 to the first antenna unit 115 according to the second through fifth clock signals CLK2~CLK5. The first through fourth pulse generators 113 and 114 can output the first through fourth new detection pulses NDP1~NDP4 to the first antenna unit 115 at the same time according to the second through fifth clock signals CLK2~CLK5.

The new first through fourth detection pulses NDP1~NDP4 may be referred to as a plurality of second detection pulses NDP1~NDP4. A level of the second detection pulses NDP1~NDP4 may be higher than a level of the default detection pulse DDP. However, example embodiments of the inventive concepts are not limited thereto.

The first antenna unit 115 receives the default detection pulse DDP from the first pulse generation unit 112. The first antenna unit 115 receives the new first through fourth detection pulses NDP1~NDP4 from the first through fourth pulse generators 113 and 114, respectively. For example, the first antenna unit 115 may receive a part of the new first through fourth detection pulses NDP1~NDP4 from the first through fourth pulse generators 113 and 114. The first antenna unit 115 outputs the received default detection pulse DDP and at least a portion of the received new first through fourth detection pulses NDP1~NDP4.

The first antenna unit 115 receives a communication pulse CCP from the communication pulse generation unit 117. The first antenna unit 115 outputs the received communication pulse CCP to the card 120. The first antenna unit 115 also receives a reflection signal from the card 120. The reflection signal is a signal generated by a card detected through the default detection pulse DDP or the new first through fourth detection pulses NDP1~NDP4. The first antenna unit 115 outputs a reflection signal to the card detection unit 116.

If the card 120 is detected by the default detection signal DDP or the new first through fourth detection pulses NDP1~NDP4, the communication pulse generation unit 116 outputs the communication pulse CCP to the first antenna unit 115.

The communication pulse generation unit 117 may be included in the second pulse generation unit 130. In some example embodiments, the card reader 100 may not include the communication pulse generation unit 117.

The card detection unit 116 may outputs the control signal CNTL to the timer 111 according to the reflection signal received from the first antenna unit 115. For example, if the card 120 is detected by the default detection pulse DDP, the first antenna unit 115 may output the reflection signal to the card detection unit 116, and the card detection unit 116 may output the control signal CNTL to the timer 111 according to the reflection signal. The timer 111 may generate the clock signals CLK1~CLK5 according to the control signal CNTL.

If the card 120 is detected by the default detection signal DDP or the new first through fourth detection pulses NDP1~NDP4, the card detection unit 116 receives a reflection signal from the card 120. The card detection unit 116 outputs the controls signal CNTL to the timer 111 according to the reflection signal. The card detection unit 116 controls an output of the second through fifth clock signals CLK2~CLK5 of the timer 111 through the control signal CNTL.

The card 120 may include a second antenna unit 121. The card 120 may be a contactless integrated circuit (IC) card such that the card reader 110 may detect the card without direct contact therebetween. However, example embodiments of the inventive concepts are not limited thereto. If the card 120 exists within a communication distance of the card reader 110, it can be detected by the default detection signal DDP or the new first through fourth detection pulses NDP1~NDP4.

The second antenna unit 121 can receive the default detection signal DDP or the new first through fourth detection pulses NDP1~NDP4 from the card reader 110. If the second antenna unit 121 receives the default detection signal DDP or the new first through fourth detection pulses NDP1~NDP4, the second antenna unit 121 outputs the reflection signal to the card reader 110.

As a size of the first antenna unit 115 of the card reader 110 in accordance with a first embodiment is reduced, a communication distance that the card 120 can be detected may be reduced. Thus, conventionally, the card 120 may not detect the default detection pulse DDP output by the card reader 110, and, therefore, the card 120 may not generate the reflection signal. In contrast, in one or more example embodiments, the card reader 110 outputs at least a portion of the new first through fourth detection pulses NDP1~NDP4 to detect the card 120.

Figure 2A:
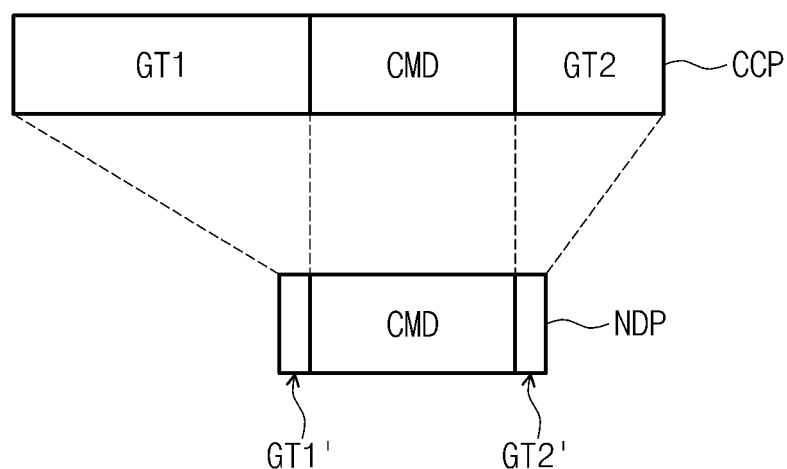

FIGS. 2A and 2B are block diagrams illustrating a new detection pulse in accordance with some example embodiments of the inventive concepts and a structure of the detection pulse using the detection pulse.

Referring to FIGS. 1, 2A and 2B, a constitution of a new detection pulse NDP is the same as that of the new first through fourth detection pulses NDP1~NDP4 to detect the card 120.

The new detection pulse NDP of FIG. 2A is formed by modifying a communication pulse CCP. The communication pulse CCP may communicate with four kinds of cards TYPEA, TYPEB, TYPEF and TYPEV depending on a command CMD.

The communication pulse CCP may include a first guard time area GT1, the command CMD and a second guard time area GT2.

The first guard time area GT1 may be a time that the card reader 110 supplies power to the card 120. Since the card 120 may not generate power, the card reader 110 may provide power for responding to a pulse during the first guard time GT1.

The second guard time area GT2 is a time of waiting a response of the card 120. That is, a time that a reflection signal output from the card 120 receiving the communication pulse CCP waits a reception to the card reader 110.

The command CMD includes information of the communication pulse CCP. The four kinds of cards TYPEA, TYPEB, TYPEF and TYPEV may include four kinds of commands REQA, REQB, SENSEF_FEQ and INVENTORY respectively.

A level of the communication pulse CCP is higher than a level of the default detection pulse DDP. Thus, the card 120 may be able to detect the communication pulse CCP further away from the card reader 110 as compared with the default detect pulse DDP. However, the communication pulse CCP has a longer duration time compared with the default detect pulse DDP. Due to the relatively high level of the communication pulse CCP, the card reader may consume relatively more power to transmit the communication pulse CCP. However, in at least some example embodiments, the card reader 110 may generate a new detection pulse NDP that reduces the first and second guard time areas GT1 and GT2.

The new detection pulse NDP may include a first guard time area GT1', the command CMD and a second guard time area GT2'.

The first and second guard time areas GT1' and GT2' of the new detection pulse NDP may be smaller than the first and second guard time areas GT1 and GT2 of the communication pulse CCP. A signal level of the new detection pulse NDP may be the same as a signal level of the communication pulse CCP. However, example embodiments of the inventive concepts are not limited thereto. The command CMD of the new detection pulse NDP may be the same as a command CMD of the communication pulse CCP. However, example embodiments of the inventive concepts are not limited thereto.

Referring to FIG. 2B, a detection pulse in accordance with some example embodiments of the inventive concepts may include the default detection pulse DDP and the new detection pulse NDP which are continuously output during a certain period of time.

For example, the card reader 110 may output the default detection pulse DDP is output at regular intervals during a first time t1. If the card 120 is not detected by the default detection pulse DDP, the card reader 110 may output the new detection pulse NDP after the first time t1. The card reader 110 may generate the new detection pulse NDP by modifying the communication pulse CCP that can communicate with the four kinds of cards TYPEA, TYPEB, TYPEF and TYPEV respectively.

For example, the card reader 110 may generate the new detection pulse NDP such that the new detection pulse NDP includes a plurality of detection pulses NDP1~NDP4 which are made by modifying the communication pulse CCP that can communicate with the four kinds of cards TYPEA, TYPEB, TYPEF and TYPEV respectively. However, example embodiments of the inventive concepts are not limited thereto. For example, the new detection pulse NDP may include only a part of the new detection pulses NDP1~NDP4. The new detection pulse NDP may include four or more kinds of detection pulses depending on the type of card 120 supported by the card reader 110.

Figure 3:
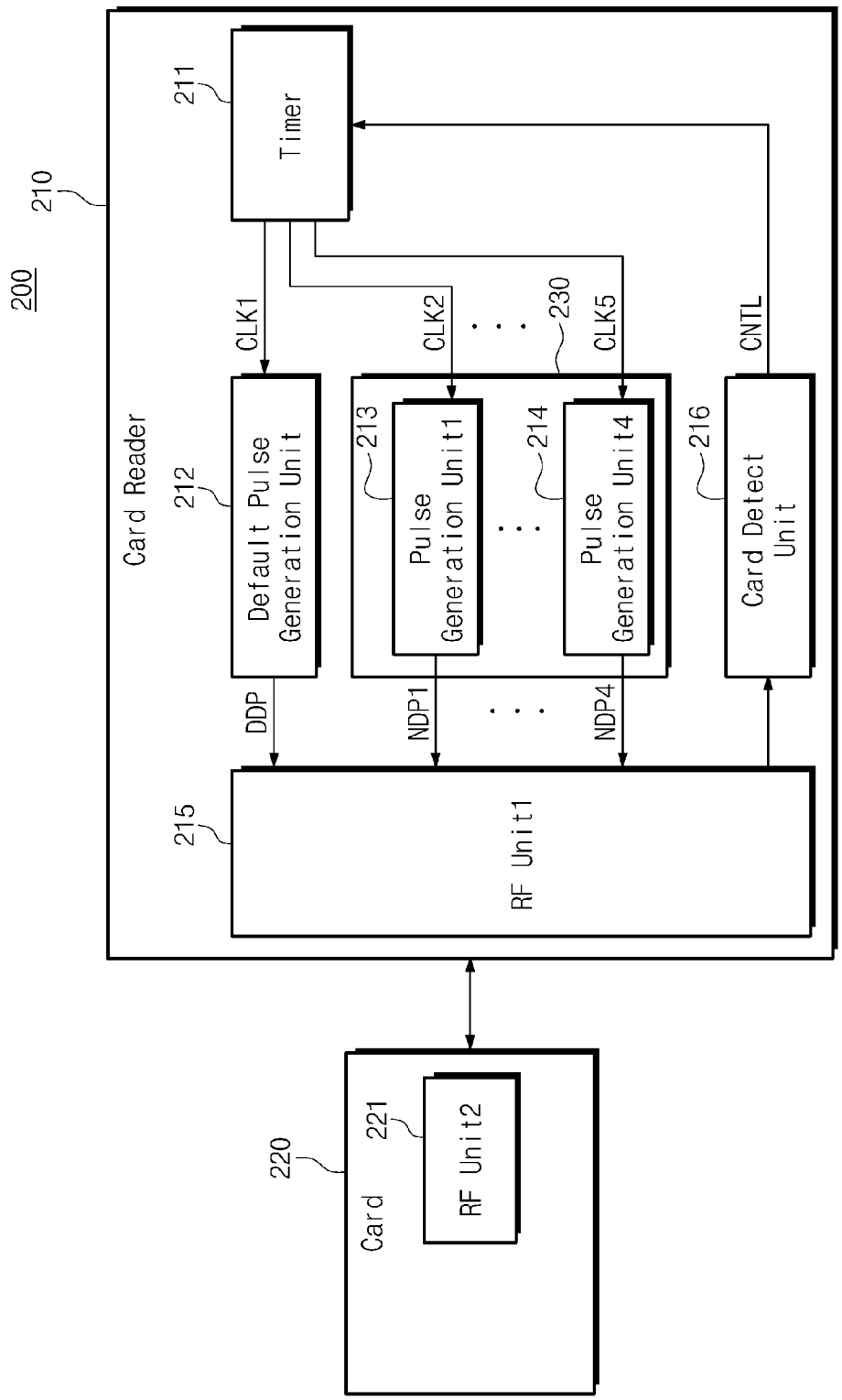
FIG. 3 is a block diagram illustrating a wireless communication system in accordance with a second example embodiment of the inventive concepts.

FIG. 3 is a block diagram illustrating a wireless communication system in accordance with a second example embodiment of the inventive concepts.

Referring to FIGS. 1 through 3, a wireless communication system 200 may include a card reader 210 and a card 220.

The card reader 210 may include an RF Unit 215, a first pulse generating unit 212, a second pulse generating unit 230, a card detection unit 216 and a timer 211. Further, the card 220 may include a second RF unit 221.

The wireless communication system 200 is similar to the wireless communication system 100 of FIG. 1 except the card reader 210 may not include the communication pulse generation unit 117. In contrast, through first through fourth pulse generators 213 and 214 included in the second pulse generating unit 230 may generate the communication pulse CCP for communicating with the card 220.

FIG. 4 is a timing diagram illustrating a card detection pulse in accordance with a first example embodiment of the inventive concepts.

Referring to FIGS. 1 through 4, a detection pulse in accordance with the first example embodiment of the inventive concepts may include the default detection pulse DDP and the first new detection pulse NDP1.

The card reader (110, 210) may output the default detection pulse DDP for an output time of a first time t1 at regular output intervals. For example, the default detection pulse DDP can be output at intervals of 500 ms during 2 s through 3 s. The output intervals and a period of the default detection pulse DDP is not limited thereto. If the card (120, 220) is not detected during the output time of the default detection pulse DDP, the card reader (110, 210) may output the first new detection pulse NDP1.

The card reader (110, 210) may generate the first new detection pulse NDP1 by modifying the communication pulse CCP that can communicate with one of the four kinds of cards TYPEA, TYPEB, TYPEF and TYPEV. The default detection pulse DDP can be used to detect all the four kinds of cards TYPEA, TYPEB, TYPEF and TYPEV. However, the first new detection pulse NDP1 may only be able to be used to detect one of the four kinds of cards TYPEA, TYPEB, TYPEF and TYPEV. Thus, the card reader 210 supporting one kind of card 220 can use a detection pulse in accordance with the first example embodiment of the inventive concepts.

Therefore, the detection pulse in accordance with the first example embodiment of the inventive concepts may recognize the card (120, 220) at a greater communication distance. For example, if the card (120, 220) is detected through the first new detection pulse NDP1, the card reader (110, 210) can detect one of the four kinds of cards TYPEA, TYPEB, TYPEF and TYPEV.

FIG. 5 is a timing diagram illustrating a card detection pulse in accordance with a second example embodiment of the inventive concepts.

Referring to FIGS. 1 through 5, a card detection pulse in accordance with the second example embodiment of the inventive concepts may include the default detection pulse DDP lasting for a first time t1 and first and second new detection pulses NDP1 and NDP2, respectively.

The card reader (110, 210) may generate the card detection pulse such that, within the card detection pulse, the default detection pulse DDP is output for a first output time t1 at regular output intervals. The default detection pulse DDP can be output at intervals of 500 ms during 2 s through 3 s. The output interval and a period of the default detection pulse DDP is not limited thereto. If the card reader (110, 210) does not detect the card (120, 220) during the output time t1 of the default detection pulse DDP, the card reader (110, 210) may sequentially output the first and second new detection pulses NDP1 and NDP2.

The card reader (110, 210) may generate the first and second new detection pulses NDP1 and NDP2 by modifying a communication pulse CCP communicating with one of the four kinds of cards TYPEA, TYPEB, TYPEF and TYPEV. For example, the card reader (110, 210) may obtain each of the first and second new detection pulses NDP1 and NDP2 by modifying different communication pulses CCP.

The card detection pulse in accordance with the second example embodiment of the inventive concepts may be used in the card reader (110, 210) supporting communication with two kinds of cards among the four kinds of cards TYPEA, TYPEB, TYPEF and TYPEV.

The card reader (110, 210) may utilize the card detection pulse in accordance with the second example embodiment of the inventive concepts to not only detect the card (120, 220) but also distinguish the type of the card (120, 220).

For instance, if the card reader (110, 210) generates the first new detection pulse NDP1 by modifying the communication pulse CCP communicating with the first card TYPEA, then, if the card reader (110, 210) detects the card (120, 220) through the first new detection pulse NDP1, the card reader (110, 210) may identify the card (120, 220) as the first card TYPEA.

Likewise, if the card reader (110, 210) generates the second new detection pulse NDP2 by modifying the communication pulse CCP communicating with the second card TYPEB, then, if the card reader (110, 210) detects the card (120, 220) through the second new detection pulse NDP2, the card reader (110, 210) may identify the card (120, 220) as the second card TYPEB.

If the card (120, 220) is not detected while the default detection pulsed DDP and the first and second new detection pulses NDP1 and NDP2 are output, the card reader (110, 210) may repeatedly output the default detection pulse DDP and the first and second new detection pulses NDP1 and NDP2 until the card (120, 220) is detected.

FIG. 6 is a timing diagram illustrating a card detection pulse in accordance with a third example embodiment of the inventive concepts.

Referring to FIGS. 1 through 6, a card detection pulse in accordance with the third example embodiment of the inventive concepts may include the default detection pulse DDP lasting for a first time t1 and first through third new detection pulses NDP1~NDP3.

The card reader (110, 210) may output the default detection pulse DDP at regular intervals for the first time t1. If the card reader (110, 210) does not detect the card (120, 220) during the first time t1, the card reader (110, 210) sequentially outputs the first through third new detection pulses NDP1~NDP3.

The card reader (110, 210) may generate each of the first through third new detection pulses NDP1~NDP3 modifying a communication pulse CCP that can communicate with three kinds of cards among the four kinds of cards TYPEA, TYPEB, TYPEF and TYPEV.

If the card (120, 220) is not detected while the first through third new detection pulses NDP1~NDP3 are output, the card reader (110, 210) may repeatedly output the default detection pulse DDP and the first through third new detection pulses NDP1~NDP3.

FIG. 7 is a timing diagram illustrating a card detection pulse in accordance with a fourth example embodiment of the inventive concepts.

Referring to FIGS. 1 through 7, a card detection pulse in accordance with the fourth example embodiment of the inventive concepts may include the default detection pulse DDP lasting for a first time t1 and first through fourth new detection pulses NDP1~NDP4.

The card reader (110, 210) may output the default detection pulse DDP at regular intervals for the first time t1. If the card reader (110, 210) does not detect the card (120, 220) during the first time t1, the card reader (110, 210) sequentially outputs the first through fourth new detection pulses NDP1~NDP4.

The card reader (110, 210) may generate each of the first through third new detection pulses NDP1~NDP3 by modifying a communication pulse CCP that can communicate with the four kinds of cards TYPEA, TYPEB, TYPEF and TYPEV.

If the card (120, 220) is not detected while the first through fourth new detection pulses NDP1~NDP4 are output, the card reader (110, 210) may repeatedly output the default detection pulse DDP and the first through fourth new detection pulses NDP1~NDP4.

Figure 8:
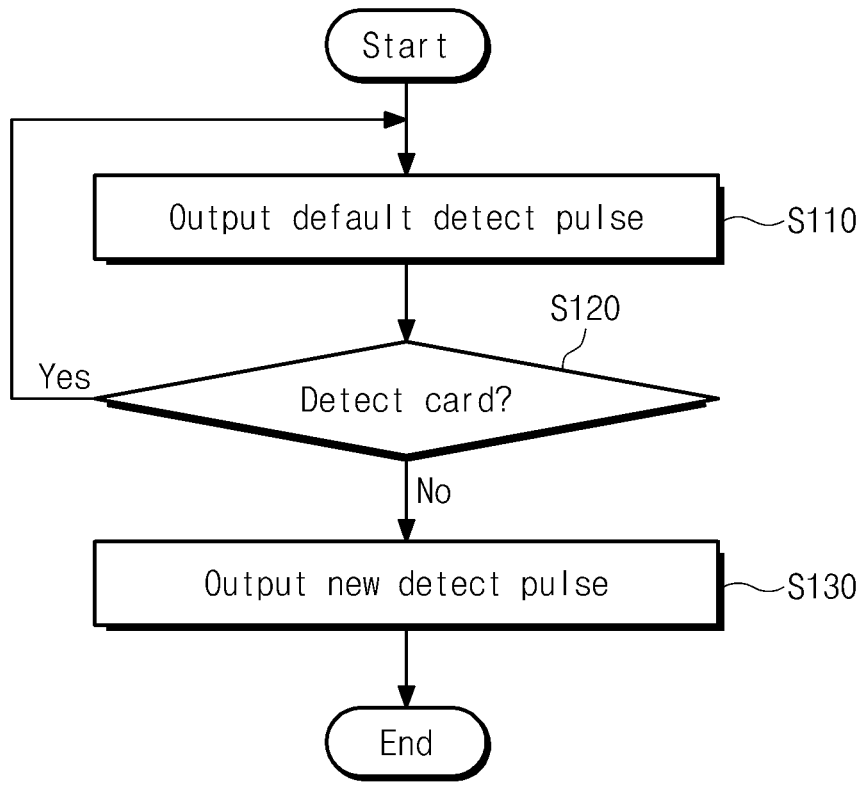
FIG. 8 is a flow chart illustrating a card detection method in accordance with a first example embodiment of the inventive concepts.

FIG. 8 is a flow chart illustrating a card detection method in accordance with a first example embodiment of the inventive concepts.

Referring to FIGS. 1 through 8, in operation S110, the first pulse generation unit (112, 212) of the card reader (110, 210) generates the default detection pulse DDP and the first antenna unit (115, 215) outputs the default detection pulse DDP to the outside. For example, the first pulse generation unit (112, 212) may generate the default detection pulse DDP and provide the default detection pulse DDP to the first antenna unit (115, 215) at regular intervals for the first time t1.

In operation S120, the card reader (110, 210) determines whether the card (120, 220) is detected. If the card (120, 220) exists within a communication distance of the card reader (110, 210), the card reader (110, 210) may detect the card (120, 220) through a reflection signal generated by the card (120, 220) in response to the default detection pulse DDP.

For example, if the card (120, 220) exists within the communication distance of the card reader (110, 210), the second antenna unit (121, 221) of the card (120, 220) may receive the default detection pulse DDP. After receiving the default detection pulse DDP, the card (120, 220) may output the reflection signal to the card reader (110, 210). If the card reader (110, 210) receives the reflection signal, a card detection operation of the card reader (110, 210) may end.

In operation S130, if the card reader (110, 210) does not detect the card (120, 220) using the default detection pulse DDP, the card reader (110, 210) may output a new detection pulse NDP to detect the card (120, 220).

For example, the card reader (110, 210) can generate at least a portion of the first through fourth new detection pulses NDP1~NDP4 through the first through fourth pulse generation units (113, 114, 213, 214), respectively, and provide at least a portion first through fourth new detection pulses NDP1~NDP4 to the first antenna unit (115, 215). The card reader (110, 210) may selectively output the first through fourth new detection pulses NDP1~NDP4 output according to the card (120, 220) supported by the card reader (110, 210) among the four kinds of cards TYPEA, TYPEB, TYPEF and TYPEV. The card reader (110, 210) can detect four or more kinds of cards and thereby output four or more new detection pulses. The first antenna unit (115, 215) may output at least a portion of the first through fourth new detection pulses NDP1~NDP4 to the outside.

Figure 9:
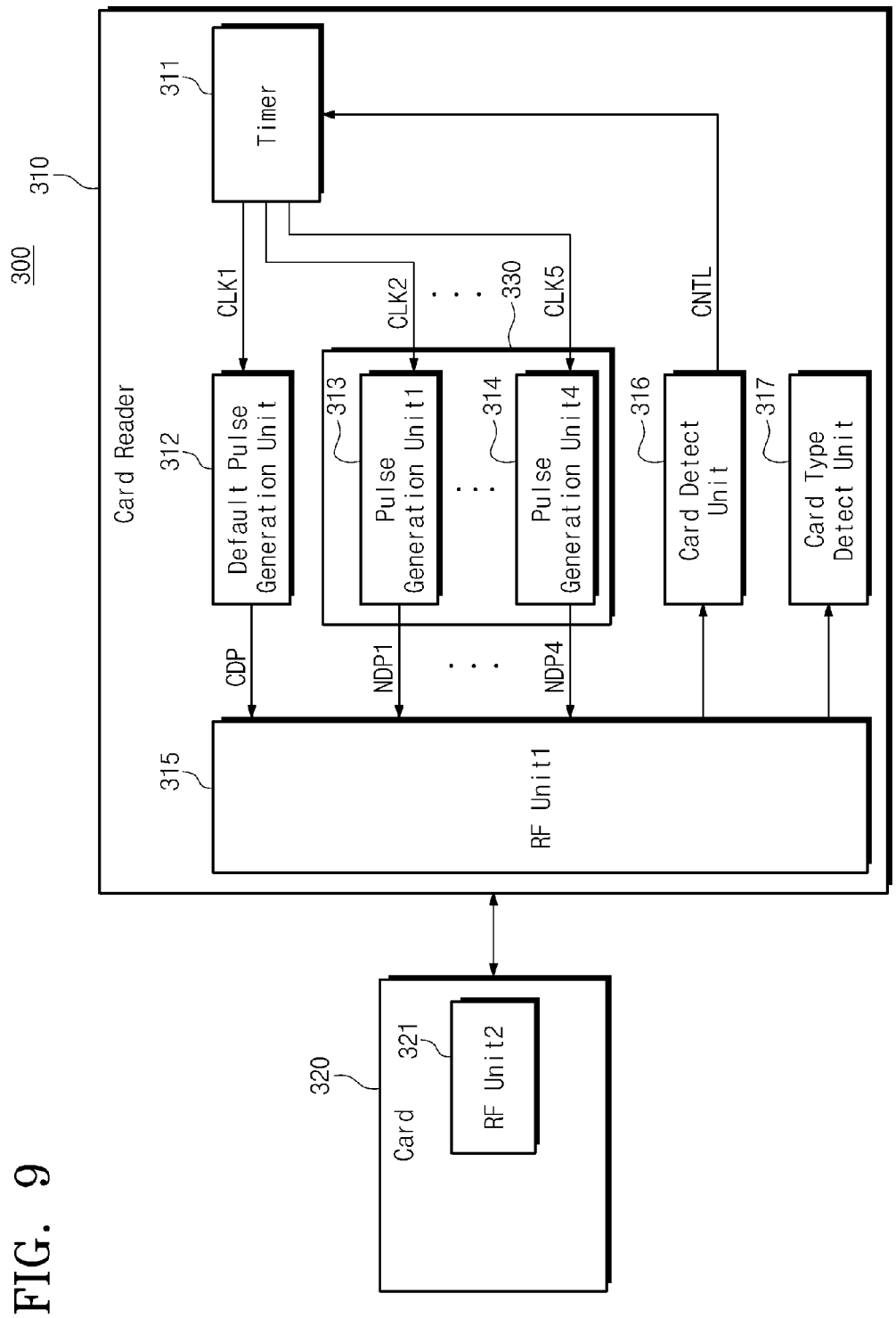
FIG. 9 is a block diagram illustrating a wireless communication system in accordance with a third example embodiment of the inventive concepts.

FIG. 9 is a block diagram illustrating a wireless communication system in accordance with a third example embodiment of the inventive concepts.

Referring to FIGS. 1, 3 and 9, a wireless communication system 300 in accordance with the third example embodiment of the inventive concepts adds a card type detection unit 317 to the card reader 210 of FIG. 3. The wireless communication system 300 includes a card reader 310 and a card 320.

The card reader 310 may include a timer 311, a first pulse generation unit 312, first through fourth pulse generators 313 and 314, a first antenna unit 315, a card detection unit 316, and a card type detection unit 317. The first through fourth pulse generators 313 and 314 may be called a second pulse generation unit 330. A drive method of the card reader 310 is similar to that of the card reader 210 of FIG. 3. The card reader 310 can detect the type of card.

The card reader 310 may detect the card 320 using first through fourth new detection pulses NDP1~NDP4 output from the first through fourth pulse generators 313 and 314. For example, if the card 320 receives one of the first through fourth new detection pulses NDP1~NDP4, the card 320 may output a reflection signal to the card reader 310. The reflection signal may be received to the card detection unit 316 and the card type detection unit 317. If the reflection signal is received, the card detection unit 316 stops an output of first through fifth clock signals CLK1~CLK5 of the timer 311. The card type detection unit 317 can judge the type (TYPEA, TYPEB, TYPEF and TYPEV) of card.

A communication pulse CCP for communicating with the card 320 can be output from the first through fourth pulse generators 313 and 314. This is selected according to the type of the card 320. However, example embodiments of the inventive concepts are not limited thereto. For example, the card reader 310 may include the communication pulse generation unit 117 illustrated in FIG. 1. The communication pulse generation unit 117 can selectively output the communication pulse CCP corresponding to the type of card detected by the card type detection unit 317.

If a card is detected, a general card reader outputs all the communication pulses with respect to the four kinds of cards TYPEA, TYPEB, TYPEF and TYPEV. However, according to some example embodiments of the inventive concepts, the card reader 310 may be configured to detect the type of card 320 through the first through fourth new detection pulses NDP1~NDP4. Thus, the card reader 310 can output a communication pulse CCP according to the type of card to reduce power consumption. Therefore, the card reader 310 may improve the functioning of the card reader 310 itself.

Figure 10:
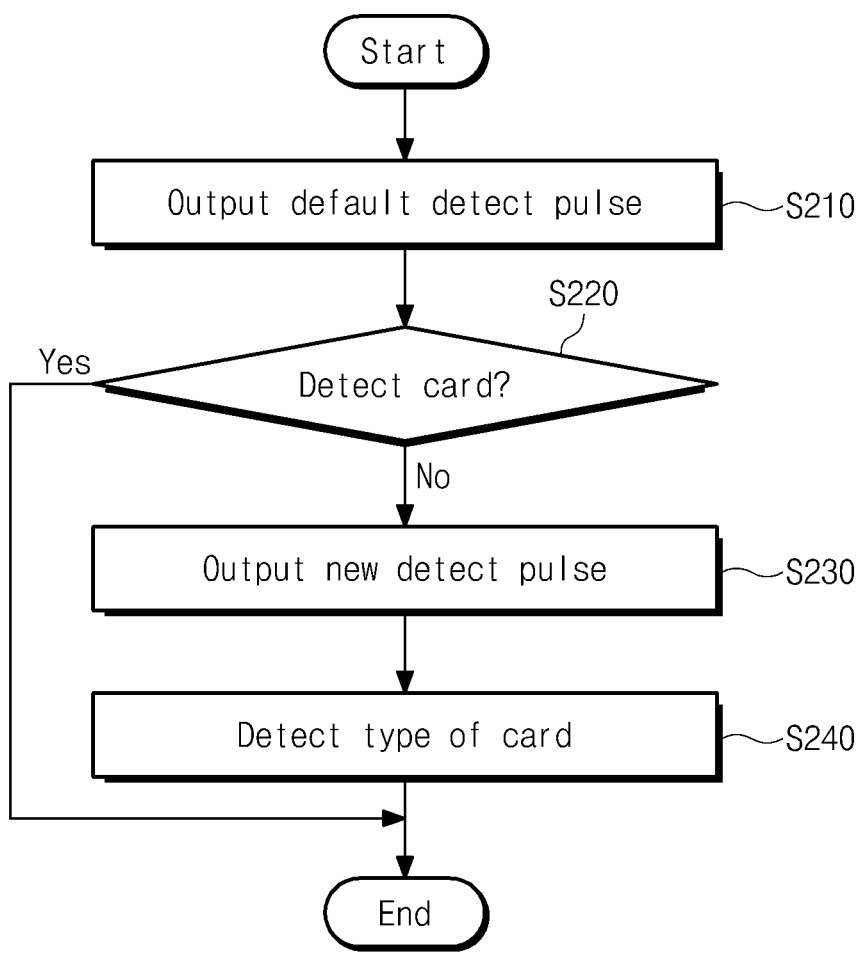
FIG. 10 is a flow chart illustrating a card detection method in accordance with a second example embodiment of the inventive concepts.

FIG. 10 is a flow chart illustrating a card detection method in accordance with a second example embodiment of the inventive concepts.

Referring to FIGS. 4 through 10, in operation S210, the card reader 310 outputs the default detection pulse DDP. For example, the pulse generation unit 312 of the card reader 310 outputs the default detection pulse DDP to the first antenna unit 315. The first antenna unit 315 outputs the default detection pulse CCP to the outside.

In operation S220, the card reader 310 determines whether the card 320 is detected. If the card 320 receives the default detection pulse DDP, the card 320 may output a reflection signal. If the card reader 310 receives the reflection signal, a card detection process may end.

In operation S230, if the card 320 is not detected by the default detection pulse DDP, the card reader 310 may output a new detection pulse NDP and determine whether the new detection pulse NDP is received by the card 320. Each of the first through fourth detection pulse generators 313 and 314 can output at least a portion of the first through fourth new detection pulses NDP1~NDP4. At least a portion of the first through fourth new detection pulses NDP1~NDP4 is output to the outside through the first antenna unit 315.

If the card 320 does not receive at least a portion of the first through fourth new detection pulses NDP1~NDP4, the card 320 may not output a reflection signal. Thus, the card reader 310 may repeat an output operation of the default detection pulse DDP.

If the card 320 is detected by at least a portion of the first through fourth new detection pulses NDP1~NDP4, the card 320 may output a reflection signal to the card reader 310. For example, the first antenna unit 315 may receive the reflection signal and transmit the reflection signal to the card type detection unit 317 of the card reader 310.

In operation S240, the card type detection unit 317 may distinguish the type of the card 320 based on the reflection signal transmitted thereto in response to one of the first through fourth new detection pulses NDP1~NDP4 generated by the card reader 310. Thus, the card type detection unit 317 can distinguish the type of the card 320 by receiving a corresponding reflection signal among the first through fourth new detection pulses NDP1~NDP4.

Figure 11:
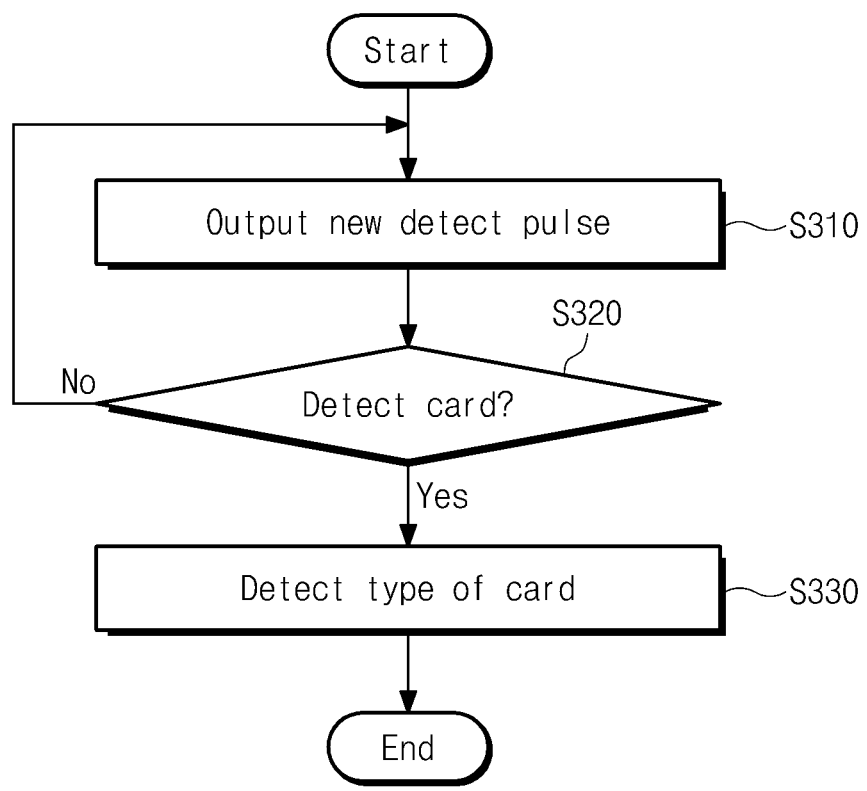
FIG. 11 is a flow chart illustrating a new detection signal output method in accordance with some example embodiments of the inventive concepts.

FIG. 11 is a flow chart illustrating a new detection signal output method in accordance with some example embodiments of the inventive concepts.

Referring to FIGS. 4 through 11, in operation S310, the card reader 310 outputs a new detection pulse NDP. One of the first through fourth detection pulse generators 313 and 314 outputs one of the first through fourth new detection pulses NDP1~NDP4. One of the first through fourth new detection pulses NDP1~NDP4 is output to the outside through the first antenna unit 315.

In operation S320, the card reader 310 checks whether the card 320 is detected. For example, the card reader 310 checks whether a reflection signal is received. If the card 320 is detected through one of the first through fourth new detection pulses NDP1~NDP4, the card 320 outputs the reflection signal. If the reflection signal output from the card 320 is not received by the card reader 310, the card reader 310 may output another detection pulse NDP. For example, the card reader 310 may output a different pulse from among the first through fourth new detection pulses NDP1~NDP4. The card reader 310 outputs one of the first through fourth new detection pulses NDP1~NDP4 which are not output and then checks whether the card 320 is detected. The card reader 310 may sequentially output the first through fourth new detection pulses NDP1~NDP4 until it is checked whether the card 320 is detected.

In operation S330, if the card reader 310 detects the card 320, then the card reader 310 may detect the type of the card 320. For example, the card type detection unit 317 of the card reader 310 can detect the type of the card 320 through a reflection signal output from the card 320.

Figure 12:
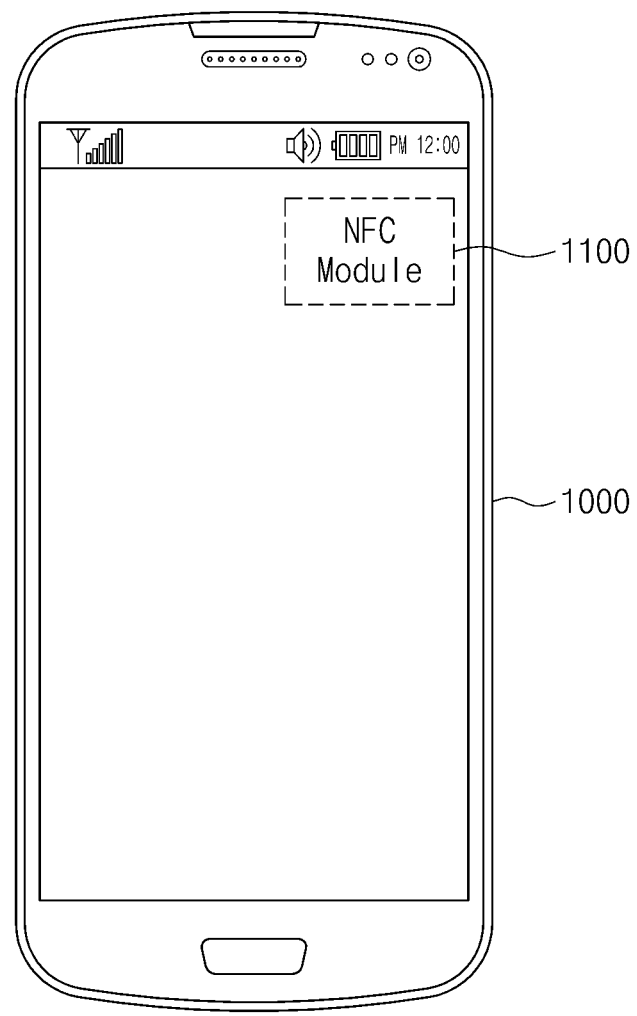
FIG. 12 is a block diagram illustrating a portable terminal including a wireless communication system in accordance with some example embodiments of the inventive concepts.

FIG. 12 is a block diagram illustrating a portable terminal including a wireless communication system in accordance with some example embodiments of the inventive concepts.

Referring to FIGS. 1 through 12, a portable terminal 1000 may include an NFC module 1100. The portable terminal 1000 can operate as the card reader (110, 210, 310) and/or the card (120, 220, 320) by including the NFC module 1100. In a card detection operation, the NFC module 1100 can secure a communication distance between an external device and the card reader by outputting the new detection pulse NDP that may be detectable by a card at a greater communication distance.

According to some example embodiments of the inventive concepts, a card reader compensating the maximum wireless communication distance using a new detection pulse while reducing power consumption and a card detection method of the card reader are provided. As a result, the card reader having an improved card detection efficiency may be provided.

Although not illustrated, the card reader 110, 210, 310 may include a processor and a memory (not shown).

The memory may be any device capable of storing data including magnetic storage, flash storage, etc. The processor may be any device capable of processing data including, for example, a microprocessor configured to carry out specific operations by performing arithmetical, logical, and input/output operations based on input data, or capable of executing instructions included in computer readable code stored in the memory.

The processor may be a logic chip, for example, a central processing unit (CPU), a controller, or an application-specific integrated circuit (ASIC), that when, executing the instructions stored in the memory, configures the processor as a special purpose machine to perform the operations illustrated in one or more of FIGS. 8, 10 and 11, discussed above.

For example, the instructions may configure the processor to perform the functions of one or more of the first pulse generating unit (112, 212, 312), the second pulse generating unit (130, 230, 330) the card detection unit (116, 216, 316), the timer (111, 211, 311) and the card type detection unit (117, 317). Therefore, the processor may generate and output the first detection pulse DDP, and if a reflection signal is not received from the card (120, 220, 320) in response thereto, the processor may generate and output one or more second detection pulses NDP having greater signal strengths than the first detection pulse DDP but a shorter duration than the communication pulse CCP due to shorter guard times (GT1, GT2) associated therewith, and determine if the reflection signal is received from the card (120, 220, 320) in response thereto. Therefore, the card reader (110, 210, 310) may improve the functioning of a card reader itself by increasing the communication distance a card may be read while reducing power consumption.

The above-disclosed subject matter is to be considered illustrative, and not restrictive, and the appended claims are intended to cover all such modifications, enhancements, and other example embodiments, which fall within the true spirit and scope of the example embodiments of the inventive concepts. Thus, to the maximum extent allowed by law, the scope of the example embodiments of the inventive concepts is to be determined by the broadest permissible interpretation of the following claims and their equivalents, and shall not be restricted or limited by the foregoing detailed description.

What is claimed is:

1. A card reader for wirelessly communicating with a card, the card reader comprising:
    a first pulse generation unit configured to generate a first detection pulse for detecting the card;
    a second pulse generation unit configured to generate at least one second detection pulse for detecting the card based on at least one communication pulse that is used to communicate with the card; and
    a card detection unit configured to detect the card based on a reflection signal received in response to the first detection pulse or the at least one second detection pulse.

2. The card reader of claim 1, wherein the second pulse generation unit includes at least one detection pulse generator configured to generate the at least one second detection pulse or the at least one communication pulse.

3. The card reader of claim 2, wherein the second pulse generation unit further comprises a communication pulse generation unit configured to generate the at least one communication pulse if the card detection unit detects the card in response to one of the first detection pulse and the at least one second detection pulse.

4. The card reader of claim 1, further comprising a timer configured to periodically output a plurality of clock signals to the first pulse generation unit and the second pulse generation unit.

5. The card reader of claim 4, wherein if the reflection signal is received from the card, the card detection unit is configured to output a control signal to the timer and to instruct the timer to stop outputting the clock signals.

6. The card reader of claim 1, wherein the at least one communication pulse comprises:
    a command for communicating with one of a type TYPEA card, a TYPEB card, a TYPEF card and a TYPEV card;
    a first guard time area in which power is applied to the card; and
    a second guard time area in which the card reader waits for a response from the card.

7. The card reader of claim 6, wherein the card reader is configured to generate the at least one second detection pulse by reducing the first and second guard time areas of the at least one communication pulse.

8. The card reader of claim 1, wherein the card reader is configured to generate the at least one second detection pulse such that the at least one second detection pulse has a signal level higher than a signal level of the first detection pulse.

9. The card reader of claim 1, further comprising a card type detection unit configured to determine a type of the card based on the reflection signal received from the card, if the card reader detects the card in response to the first detection pulse or the at least one second detection pulse.

10. The card reader of claim 1, wherein the second pulse generation unit is configured to generate the at least one second detection pulse to detect the card, if the card is not detected in response to the first detection pulse.

11. An operation method of a card reader configured to detect a card comprising:
    generating a first detection pulse for detecting the card;
    periodically outputting the first detection pulse to detect the card;
    determining whether the card is detected;
    generating at least one second detection pulse by modifying at least one communication pulse used to communicate with the card; and
    sequentially outputting the at least one second detection pulse based on whether the card is detected.

12. The operation method of claim 11, wherein the outputting the at least one second detection pulse further comprises:
    outputting a first one of the at least one second detection pulse;
    determining whether the card is detected; and
    outputting a second one of the at least one second detection pulse based on whether the card is detected in response to the first one of the at least one second detection pulse.

13. The operation method of claim 12, further comprising:
    determining a type of the card, if the card is detected in response to the first detection pulse or the at least one second detection pulse.

14. The operation method of claim 12, further comprising outputting the first detection pulse again, if the card reader does not detect the card in response to one of the at least one second detection pulse.

15. A card reader comprising:
    an antenna; and
    a processor configured to,
        output, via the antenna, a first detection pulse to detect a card, and
        output, via the antenna, at least one second detection pulse if the card is not detected by the first detection pulse, the at least one second detection pulse being generated using at least one communication pulse associated with communicating with the card.

16. The card reader of claim 15, wherein the processor is configured to detect the card by waiting for receipt of a reflection signal from the card in response to the card receiving one of the first detection pulse and the at least one second detection pulse.

17. The card reader of claim 15, wherein the card reader is configured to support near field communication to communicate data with the card using the at least one communication pulse after the card is detected.

18. The card reader of claim 15, wherein the card reader is configured to generate the at least one second detection pulse such that the at least one second detection pulse has a signal level higher than a signal level of the first detection pulse and guard times shorter than the at least one communication pulse, and the card reader is configured to supply power to the card during a first one of the guard times, and wait for a response from the card during a second one of the guard times.

19. The card reader of claim 17, wherein the response from the card is a reflection signal generated in response to one of the first detection pulse and the at least one second detection pulse.

20. The card reader of claim 15, wherein the processor is configured to modify guard times associated with the at least one communication pulse to generate the at least one second detection pulse such that the at least one second detection pulse has guard times associated therewith that are shorter than the guard times associated with the at least one communication pulse.

\* \* \* \* \*